United States Patent [19]
Cheng

[11] 3,897,217

[45] July 29, 1975

[54] CARBON BLACK PRODUCTION PROCESS AND REACTOR

[75] Inventor: Paul J. Cheng, Bartlesville, Okla.

[73] Assignee: Phillips Petroleum Company, Bartlesville, Okla.

[22] Filed: Aug. 24, 1973

[21] Appl. No.: 391,476

[52] U.S. Cl. .................. 23/259.5; 259/4; 423/450; 423/455; 431/353; 431/354
[51] Int. Cl. ......................... C09c 1/50; F23d 13/40
[58] Field of Search .......... 23/259.5; 423/450, 455, 423/456, 457; 431/350, 353, 354, 171; 239/428, 434, 590.5, 590, 461, 463; 259/4

[56] References Cited
UNITED STATES PATENTS

| | | | |
|---|---|---|---|
| 1,026,815 | 5/1912 | Matteson | 431/354 UX |
| 1,671,352 | 5/1928 | DeGuise | 431/353 |
| 2,852,346 | 9/1958 | Austin | 23/259.5 X |
| 3,002,819 | 10/1961 | Brace et al. | 431/354 X |
| 3,046,096 | 7/1962 | Heller et al. | 23/259.5 X |
| 3,297,305 | 1/1967 | Walden | 259/4 |
| 3,588,304 | 6/1971 | Guth | 431/353 |
| 3,728,437 | 4/1973 | Vanderveen | 23/259.5 X |
| 3,753,658 | 8/1973 | Henderson et al. | 431/353 X |

FOREIGN PATENTS OR APPLICATIONS 286,207  12/1928  United Kingdom................ 23/259.5

Primary Examiner—James H. Tayman, Jr.
Assistant Examiner—Roger F. Phillips

[57] ABSTRACT

A carbon black reactor has a diffuser positioned proximate the hydrocarbon feed inlet for regulation of the flow of a plurality of gas streams introduced into the reactor through its circumferential periphery.

8 Claims, 7 Drawing Figures

CARBON BLACK PRODUCTION PROCESS AND REACTOR

This invention relates to a novel carbon black production process and to the reactor in which that process can be practiced.

In another aspect, this invention relates to a process and apparatus for producing a carbon black having a narrower range of properties.

U.S. Pat. No. 2,564,700, the disclosure of which is incorporated herein by reference, concerns a reactor having an enlarged section followed by a reaction section. Fuel and a free oxygen-containing oxidant, hereinafter referred to as air, or hot combustion gases which can contain excess air and uncombusted fuel are introduced into the reactor radially or tangentially through the circumferential periphery of the enlarged section. The fuel is oxidized with the air to produce hot combustion gases. These hot combustion gases, or those introduced as such, are introduced into contact with the hydrocarbon feed the principal portion of which is introduced axially into the enlarged section. Contact between hot combustion gases and the hydrocarbon feed produces a reactant mass in which the hydrocarbon feed is brought to its pyrolytic decomposition temperature. This reactant mass is then conducted from the enlarged section into the reaction section to produce carbon black which is recovered.

The present invention is practiced under the general conditions set forth in the aforementioned patent and the carbon black reactor described therein is the preferred reactor employed in the present invention although all reactors, including those of substantially uniform diameter over their lengths, can be employed. The present invention is an improvement over prior art reactors in that it provides additional features for diffusion-mixing of that core of hydrocarbon feed axially introduced into the mixing section.

In the present method of producing carbon black, hydrocarbon feed is introduced axially into a reactor and a first stream of fuel and air, or hot combustion gases, are introduced through the circumferential periphery of the reactor. The fuel is oxidized with the air to produce hot combustion gases and the hot combustion gases are brought into contact with the hydrocarbon feed to form a first reactant mass. At least a portion of the first reactant mass is passed through a diffuser and into contact with a second mass of hot combustion gases introduced through the circumferential periphery of the reactor to form a second reactant mass. The second reactant mass is passed into the reaction section from which the carbon black is recovered.

In order to separately control core mixing and diffusional radial mixing in the enlarged section, a hollow unit, preferably conical over a portion of its length, referred to above as a diffuser, is positioned surrounding the axial oil inlet. This diffuser extends downstream of the first of two sets of ports opening tangentially into the enlarged zone. The diffuser is apertured at its upstream end in order to allow flow of hot combustion gases from the upstream end of the enlarged zone of the reactor into the axial flow through the diffuser to effect core mixing at this locus. Hot combustion gases entering from the second of the two sets of ports opening tangentially into the enlarged zone of the reactor effect diffusional mixing.

According to this invention, there is also provided a carbon black reactor having a mixing section, preferably an enlarged section, that is, a precombustion section in combination with a combustion section, and a reaction section in axial, contiguous alignment, the mixing section being adapted with a first plurality of ports opening thereinto and a second plurality of ports opening thereinto in axially spaced relationship to the first plurality of ports. The mixing section is also adapted with a conduit for the axial introduction of the hydrocarbon feed thereinto. For the purposes of this disclosure, the terms "enlarged section" and "mixing section" will be used interchangeably inasmuch as, in the preferred embodiment, the mixing section will be an enlarged section although as stated, the mixing section can be of a diameter equal to the diameter of the reaction section.

Positioned in the enlarged section is the diffuser. This diffuser is positioned in relation to the positioning of the first plurality of ports and has a diameter related to the diameter of the section in which it is positioned.

The invention will be better understood if explained in conjunction with the attached drawings in which FIG. 1 is a view in elevation of the preferred reactor;

Figure 5:
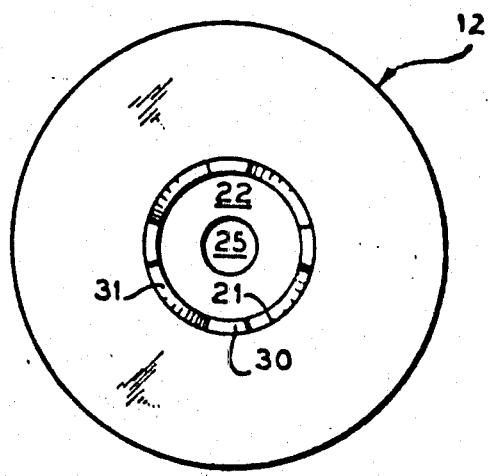
Figure 6:
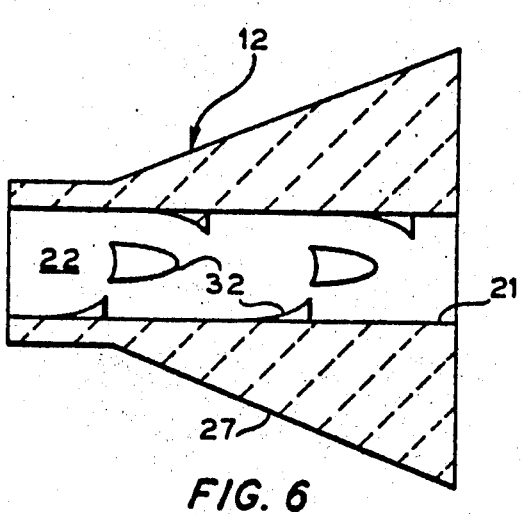
Figure 7:
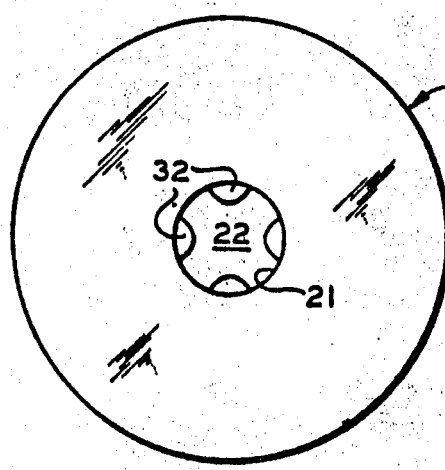

FIGS. 5, 6 and 7 (the latter being an end view of FIG. 6) illustrate various embodiments of the passageway.

Figure 1:
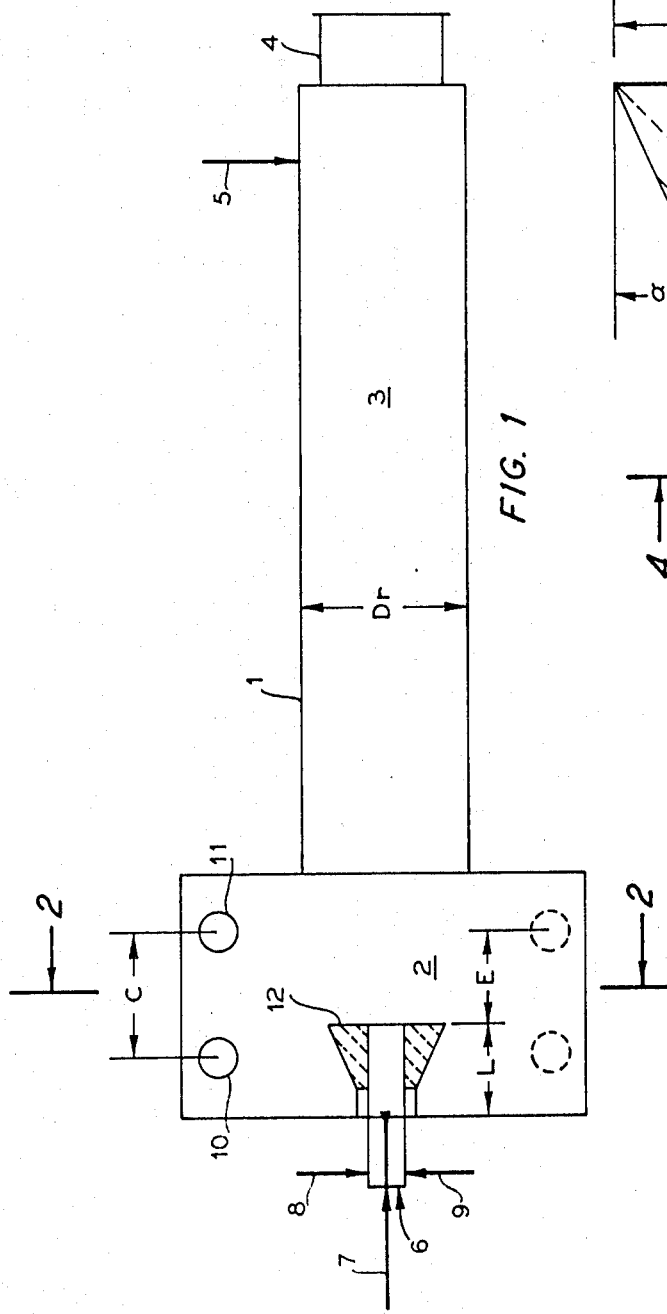
Figure 2:
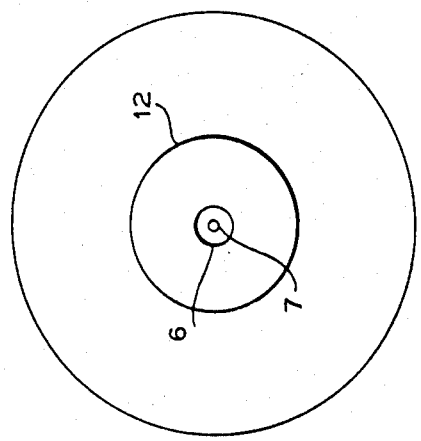
FIG. 2 is a cross-sectional view through section 2—2 of FIG. 1.

Referring now to FIG. 1 there is shown a preferred reactor 1, absent conventional insulation, adapted with enlarged section 2, and reaction section 3 from which carbon black is recovered from outlet conduit 4 after having been quenched with quench introduced through conduit 5 in the usual manner. Enlarged section 2 is also adapted with multi-fluid nozzle 6 by means of which simultaneous axial introduction can be made of hydrocarbon feed through nozzle 7, air through conduit 8 and fuel through conduit 9.

Enlarged section 2 is adapted with at least one port or conduit opening 10 opening radially but preferrentially tangentially into the section and with at least one port or conduit opening 11 positioned downstream thereof and opening into the reactor in a similar manner. Either port or plurality of ports open radially or tangentially into the enlarged section through its circumferential periphery and all ports, if provided in pluralities, are positioned on a center line common to that plurality.

Positioned within the enlarged section circumferentially of the multi-fluid nozzle is diffuser 12. It will be fabricated of a suitable high temperature ceramic material, such as silmanite, and will be fixedly positioned in any suitable manner.

Figure 3:
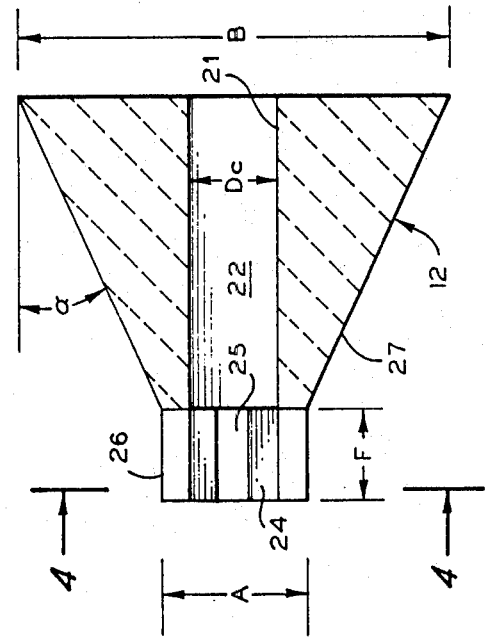
FIG. 3 is an enlarged view of a typical diffuser.
Figure 4:
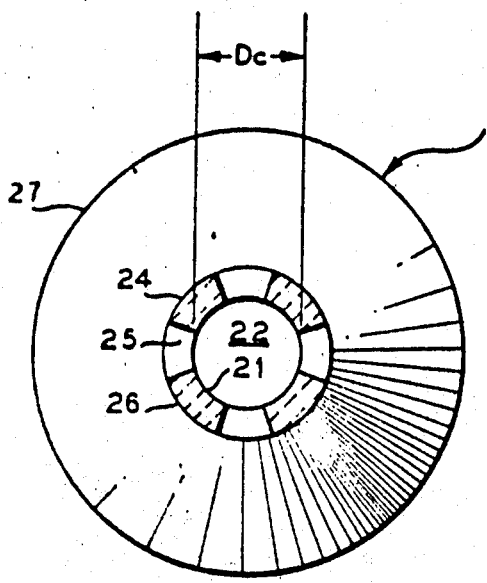
FIG. 4 is a cross-sectional view of the diffuser through section 4—4 of FIG. 3.

Referring now to FIG. 3, there is shown an enlarged view of a preferred embodiment of a diffuser, which, in general, comprises a member having a passageway traversing its length and a plurality of channels opening into the passageway through its circumferential periphery proximate its upstream end.

The diffuser, preferably, will be comprised of a first cylindrical section 26 and a second conical section 27.

The first, or upstream section 26 will be made up of a plurality of spaced-apart members 24 forming a discontinuous wall and encircling passageway 22 which traverses the length of the diffuser. The spaced-apart members form channels 25 which open into passageway 22. Preferably, the first section will be cylindrical and the second section will form a frustum although the second section can comprise a cylinder of the same or different diameter. Alternately, the entire diffuser can be in the shape of a frustum. Passageway 22 will be of a size sufficient to allow hydrocarbon feed nozzle 6 to be positioned therein. The total cross-sectional area of the channels 25 will be within the range of from about 2 to about 20% of the total cross-sectional area of the first plurality of conduits 10.

The second section, or downstream section 27, will have a solid uninterrupted circumferential wall 21 with passageway 22 penetrating its entire length. Preferably, the passageway 22 will be substantially smooth and cylindrical. However, the passageway can be adapted with features which facilitate mixing. For example, the passageway can be rifled, that is, comprised of lands 30 and grooves 31, as shown in FIG. 5. In this instance, the passageway will have from 4 to 8 lands with the rifling making about one-half revolution over the length of the diffuser.

Similarly, the passageway can contain a plurality of projections 32 as shown in FIG. 6 and FIG. 7. The projections will be positioned extending outwardly from the wall so as to direct the flow inwardly towards the center of the passageway. Any number of such projections of any shape can be employed.

In the first embodiment of this invention, at least hydrocarbon feed is introduced from a multi-feed nozzle 6 into the axial passageway 22 in the diffuser 12. Hot combustion gases are introduced through four ports tangentially into the enlarged precombustion section. These hot combustion gases pass through radial channels 25 in the diffuser 12 into contact with the hydrocarbon feed. Thereby a first reaction mixture is formed which passes through the passageway 22 in the diffuser 12. The diffuser provides a core mixing zone. The hot combustion gases entering into said zone mix with the hydrocarbon feed. The first reaction mixture leaving the diffuser 12 is then contacted with hot combustion gases introduced tangentially into the enlarged section 12 via four ports 11. Thus, a second reaction mixture is formed which is at a temperature high enough for pyrolytic decomposition of a hydrocarbon feed. This second mixture then enters the reaction zone 3. While the second reaction mixture moves through said reaction section, the principal portion of the carbon black is formed.

As illustrated on the drawing, various alphabetical notations have been used herein to designate various dimensions of the apparatus depicted. These alphabetical notations and their interrelationships are as follows:

A. — diameter of the upstream end 26 of diffuser 12.
B. — diameter of the downstream end of section 27 of diffuser 12.
Dc. — diameter of passageway 22 through diffuser 12.
Dr. — diameter of reaction section 3.
C. — distance between centerlines of the first plurality of ports 10 and the second plurality of ports 11.
L. — overall length of diffuser 12.
E. — distance from downstream extremity of diffuser 12 to center line of second plurality of ports 11. E.
F. — length of cylindrical section 26 of diffuser 12.
α. — the angle of inclination of frustum section 27 of diffuser 12.
N. — number of channels 25 in diffuser 12.

Na. — total cross-sectional area of the channels 25 in diffuser 12.
R. — ratio of cross-sectional area of passageway 22 to total cross-sectional area of channels 25 in diffuser 12.

In the best mode of operation of the apparatus of this invention, the diffuser is positioned with its upstream extremity in contact, or substantially in contact, with the upstream wall of enlarged section 2. The hydrocarbon feed inlet nozzle will be positioned preferably with its downstream extremity extending slightly into the upstream extremity of the diffuser. Fuel and air, or hot combustion gases, are introduced through ports 10 and 11 in prior art quantities such that the total is sufficient for the process. Of the total quantity of gaseous fluid introduced through ports 10 and 11, from about 5 to about 50 volume percent of the total will be introduced through the upstream ports 10. The combustion gases from ports 10 and 11, preferably will contain from about 10 to about 80 volume percent excess air above the stoichiometric requirements to completely oxidize the fuel. When the combustion gases introduced through ports 10 have the lower range of excess air (hotter gases) than the gases introduced through ports 11, (cooler gases), oxidized black is produced. When gases introduced through ports 10 have higher excess air than gases introduced through ports 11, a different black is produced. Any combinations of excess air can be used in ports 10 and 11 to affect the carbon black properties as desired. Alternately, or conjunctively, the hot combustion gases introduced through ports 10 and 11 can be at different temperatures, either being at the higher temperature as may be desired.

The diffuser can be employed with any reactor of any size. However, it will preferably be employed in a reactor in which the enlarged section has a diameter within the range of from about 25 to about 45 inches and a length of from about 10 to about 20 inches. The diameter of the reaction section will preferably be from about 8 to about 17 inches. The preferred ranges of relationships for the dimensions of the reactor in relation to the diffuser will be:

½ $Dr < Dc <$ ¾ $Dr$,
and
$1/6\ Dr < L <$ ½ $Dr$

The preferred dimensional ranges of the diffuser will be about as follows, all dimensions being expressed in inches, except as noted.

| | |
|---|---|
| A | 5 to 15 |
| B | 6 to 20 |
| Dc | 4 to 11 |
| C | 6 to 14 |
| L | 1.5 to 6 |
| E | 4 to 15 |
| F | 0.5 to 1.5 |
| α | 20° to 60° |
| N | 3 to 8 (number of slots 25) |
| Na | 4 to 30 (square inches) |
| R | 2 to 4 (ratio) |

The expected operation of the apparatus of the present invention employing $SO_2$ extract-oil as hydrocarbon feed, air as the gaseous oxidant and natural gas as fuel will be as follows when employing a reactor and a diffuser having dimensions within the ranges set forth above.

| | |
|---|---|
| Hydrocarbon Feed, GPH | 205 |
| Tangential Air Introduction, SCFH | |
| Through Ports 10 | 65,000 |
| Through Ports 11 | 120,000 |
| Tangential Fuel, Methane, SCFH | |
| Through Ports 10 | 5,400 |
| Through Ports 11 | 6,930 |
| Ports 10 have about 20% excess air. | |
| Ports 11 have about 73% excess air. | |
| Reactor | |
| Enlarged Section | |
| Length, inches | 15 |
| Diameter, inches | 38 |
| E, inches | 8 |
| C, inches | 9 |
| Reaction Section | |
| Diameter Dr, inches | 10 |
| Diffuser | |
| A, inches | 9 |
| B, inches | 12 |
| Dc, inches | 6 |
| L, inches | 4 |
| F, inches | 0.8 |
| α, degree of angle | 25 |
| N, number of slots | 4 |
| Na, square inches | 10 |
| R, ratio | 3 |

The carbon black reactor will be operated under prior art conditions, that is employing a reactor temperature within the range of from about 1,800° F. to about 3,000° F. at pressures up to about 2 psig. Any of the reactants, including the air and hydrocarbon feed, can be preheated. Preferably the fuel will be oxidized in the conduits opening into the enlarged section through ports 10 and 11 such that there is introduced into the enlarged section hot combustion gases containing air and residual portions of uncombusted fuel.

Under the aforementioned conditions, there will be produced a carbon black estimated to have a nitrogen surface area of about 103 $M^2$/gm, and a dibutylphthalate structure (loose black) of about 126 cc/100 g., a DPG value of about 30 microequivalents/gram, at a photometer of about 90. (The 24M4 DBP value will be about 102 cc/100 gm.) (See U.S. Pat. No. 3,548,454.)

It will be understood that various modifications can be made to the method of operation and apparatus of this invention. Such, however, are considered as being within the skill of the art.

What is claimed is:

1. A carbon black reactor comprising
   a. a tubular enlarged mixing section;
   b. a tubular reaction section in open communication and axial alignment operatively connected with said enlarged mixing section;
   c. hydrocarbon feed means connected to said reactor for the axial introduction of hydrocarbon feed into said enlarged mixing section;
   d. first conduit means for the introduction of hot combustion gases into said enlarged mixing section;
   e. second conduit means for the introduction of hot combustion gases into said enlarged mixing section, the outlet of said second conduit means being located axially downstream of the outlet of said first conduit means;
   f. a conical diffuser member positioned in said enlarged mixing section such that the smaller upstream end thereof is proximate to the locus of discharge of said hydrocarbon feed means, said diffuser member further having a tubular passageway longitudinally traversing its length along the reactor axis for passing the hydrocarbon feed through said passageway into said enlarged mixing section, said diffuser member further having a plurality of channels opening through the periphery of the smaller upstream end thereof so as to establish communication between said enlarged mixing section and said passageway and having the larger downstream end thereof terminating axially downstream of the outlet of said first conduit means; and
   g. carbon black recovery means connected to the end of said reaction section.

2. A carbon black reactor in accordance with claim 1 wherein said diffuser member comprises an upstream cylindrical portion coaxially connected to the small end of a downstream frustoconical portion, said channels opening through the periphery of said cylindrical portion.

3. The reactor of claim 2 in which said passageway has a diameter within the range of from about 0.5 to about 0.75 the diameter of said reaction section.

4. The reactor of claim 2 in which said diffuser has a length within the range of from about one-sixth to about one-half the diameter of said reaction zone.

5. The reactor of claim 3 in which said diffuser has a length within the range of from about one-sixth to about one-half the diameter of said reaction section.

6. The reactor of claim 1 in which said diffuser has a length within the range of from about 1.5 to about 6 inches and the diameter of said passageway is within the range of from about 4 to about 11 inches.

7. The reactor of claim 1 in which said diffuser has a rifled passageway.

8. The reactor of claim 1 in which the passageway of said diffuser is adapted with a plurality of projections extending inwardly towards the longitudinal axis of said passageway.

* * * * *